United States Patent
Nakao

(10) Patent No.: US 7,033,091 B2
(45) Date of Patent: Apr. 25, 2006

(54) PRINTING CONTROL DEVICE AND IMAGE FORMING DEVICE

(75) Inventor: Shuji Nakao, Kobe (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 0 days.

(21) Appl. No.: 10/802,768

(22) Filed: Mar. 18, 2004

(65) Prior Publication Data

US 2004/0213615 A1     Oct. 28, 2004

(30) Foreign Application Priority Data

Apr. 25, 2003   (JP)   ............... 2003-121990

(51) Int. Cl.
*B41J 11/44*   (2006.01)
(52) U.S. Cl. ............... 400/76; 400/70; 400/61; 358/1.14
(58) Field of Classification Search .......... 400/76, 400/70, 61; 358/1.14–1.15
See application file for complete search history.

(56) References Cited

U.S. PATENT DOCUMENTS 6,088,119 A * 7/2000 Manchala et al. ......... 358/1.14
6,089,765 A * 7/2000 Mori ..................... 400/61
2001/0016912 A1* 8/2001 Takahashi ............... 713/200
2002/0080397 A1* 6/2002 Igarashi et al. ........... 358/1.15
2003/0028811 A1* 2/2003 Walker et al. ............ 713/202
2003/0206311 A1* 11/2003 Konsella et al. .......... 358/1.14
2004/0103140 A1* 5/2004 Huddleston et al. ....... 709/203

FOREIGN PATENT DOCUMENTS

| JP | 05-221089 A | 8/1993 |
| JP | 08-016520 A | 1/1996 |
| JP | 11-091210 A | 4/1999 |
| JP | 2002-123379 A | 4/2002 |

OTHER PUBLICATIONS

Computer translation of JP 05-221089.*

* cited by examiner

*Primary Examiner*—Minh Chau
(74) *Attorney, Agent, or Firm*—Buchanan Ingersoll PC

(57) ABSTRACT

Upon receiving the printing data and a password set up for the particular printing data, a printer functioning as an image forming device permits the received printing data to be printed and also saves this printing data into the hard disk. When the password entered into the printer after saving the printing data matches with the password received from the PC together with the printing data, the printing of the printing data saved in the hard disk is allowed.

15 Claims, 14 Drawing Sheets

PRINTING

PRINTER
PRINTER NAME (N): MinoltaPi3504    PROPERTY (P) — 501
STATUS: IDLING
KIND: MinoltaPi3504
LOCATION: IP_150.17.41.69

RANGE OF PRINTING
● ALL (A)
○ CURRENT PAGE (E)
○ PAGE DESIGNATION (G):

NUMBER OF COPIES TO BE PRINTED
NUMBER OF COPIES (C): 1

OBJECT OF PRINTING (W): DOCUMENT

DESIGNATION OF PRINTING (R): ALL PAGES

ENLARGE/REDUCE
NUMBER OF PAGES PER SHEET (H): 1 PAGE
DESIGNATION OF PAPER SIZE (Z): NO SCALING

OK — 502    CANCEL — 503

600

610 {
611 — %12345X@PJL JOB NAME="Sample1.doc"
612 — %PJL SET USERNAME=nakao
613 — %PJL SET SECUREMODE=NORMAL_AND_SAVE
614 — %PJL SET PASSWORD=Nq35HbMj
}

620 — ········ (IMAGE DATA) ························

PRINTING CONTROL DEVICE AND IMAGE FORMING DEVICE

This application is based on Japanese Patent Application No. 2003-121990 filed on Apr. 25, 2003, the contents of which are hereby incorporated by reference.

BACKGROUND OF THE INVENTION

1. Field of the Invention

The present invention relates to a device, a method and a program for controlling printing, and a device, a method and a program for forming image.

2. Description of the Related Art

In a printing system where a PC (personal computer) and a printer are connected on a network such as a LAN, the PC can transmit a printing job to the printer via the network to be printed by the printer.

However, there are cases that are not desirable from the standpoint of keeping confidentiality of printed matters as printed matters can be exposed to the eyes of third parties between the time the user transmits a printing job from the PC to the printer and the time when the printed matters are picked up.

In order to solve this problem, a technology has been proposed wherein a password is issued for a printing data at a PC, the particular printing data and the password are transmitted to a printer, and the printing data is printed on paper only when said password is keyed into the printer (e.g., Unexamined Publication No. JP-A-5-221089).

In the abovementioned conventional art, however, the user in some cases may wish to obtain printed matters quickly without spending time and effort to obtain passwords, so that it is necessary to specify a normal printing mode which does not require a password. In this case, although the user can obtain printed matters quickly, confidentiality may be compromised since the particular printing data are saved in such a manner that does not require passwords for reprinting, if it is required to save printing data after processing. On the other hand, if a secure printing mode is specified and a password is set up for assuring confidentiality, the user has to spend some time in front of the printer wasting time, as the printer does not start to print until the password is keyed into the printer.

SUMMARY OF THE INVENTION

It is an object of the present invention to provide a device, a method and a program for controlling printing, and a device, a method and a program for forming image, which are improved for solving the abovementioned problems.

It is a more specific object of the present invention to provide a device, a method and a program for controlling printing, and a device, a method and a program for forming image for obtaining a printed matter more quickly, while securing confidentiality of printing data.

According to an aspect of the invention, there is provided a printing control device, comprising: a receiving unit for receiving printing data and first information set up for said printing data; a first permission unit for permitting the printing of said printing data received by said receiving unit; a saving unit for saving said printing data received by said receiving unit; an entry unit to which second information is entered after said printing data is saved in said saving unit; and a second permission unit for permitting the printing of said printing data saved in said saving unit when said second information corresponds with said first information.

The present invention makes it possible for a user to obtain a printed matter of the printing data quickly at the place where printing is performed, while maintaining confidentiality of said printed data, as the printed matter is quickly obtained, by simply instructing the transmission of the printing data and the first information only once. Also, since the processed printed data is saved under a condition that it cannot be printed unless the second information corresponding to the first information is entered, the confidentiality of the printing data while it is in storage is secured.

According to another aspect of the invention, there is provided an image forming device, comprising: a receiving unit for receiving printing data to which a password is set up; a saving unit for saving said printing data received by said receiving unit; a printing unit for printing the printing data received by said receiving unit or the printing data issued by said saving unit; a judging unit for judging as to whether the printing data to be printed is one which is issued by said saving unit or not; and a control unit capable of controlling in such a manner as to allow said printing unit to print printing data without requiring the password to be entered if the printing data to be printed is one which is not issued from said saving unit, and to allow said printing unit to print the printing data only after the password is entered if the printing data to be printed is one which is issued from said saving unit.

According to still another aspect of the invention, there is provided an image forming device, comprising: a receiving unit for receiving printing data to which a password is set up; a printing unit for printing the printing data; a saving unit for saving the printing data; and a control unit capable of controlling in such a manner as to cause the printing data to be saved into said saving unit after printing the received printing data without requiring the password to be entered, and to allow said printing unit to print the printing data only after the password is entered when the printing data is retrieved from said saving unit to be reprinted.

According to a further aspect of the invention, there is provided a printing control method comprising the steps of: 1) receiving printing data and first information set up for said printing data; 2) permitting the printing of said printing data received in step 1); 3) saving said printing data received in step 1) into a saving unit; 4) entering second information after said printing data is saved in said saving unit; and 5) permitting the printing of said printing data saved in said saving unit when said second information corresponds with said first information.

According to a still further aspect of the invention, there is provided an image forming method comprising the steps of: 1) receiving printing data to which a password is set up; 2) saving said printing data received in step 1) into a saving unit; 3) judging whether printing data to be printed is one which is issued from said saving unit or one which is not issued from said saving unit but rather the printing data received in step 1); and 4) printing the printing data without requiring the password to be entered if the printing data to be printed is one which is not issued from said saving unit but rather the printing data received in step 1), and printing the printing data only after the password is entered if the printing data to be printed is one which is issued from the saving unit.

According to a yet further aspect of the invention, there is provided an image forming method comprising the steps of: 1) receiving printing data to which a password is set up; 2) printing the received printing data without requiring the password to be entered; 3) saving the received printing data into a saving unit after printing the received printing data in step 2); and 4) printing the printing data after the password is entered if the printing data is retrieved from the saving unit to be reprinted.

According to a yet further aspect of the invention, there is provided a program for causing a computer to execute a process comprising the steps of: 1) receiving printing data and first information set up for said printing data; 2) permitting the printing of said printing data received in step 1); 3) causing said printing data received in step 1) to be saved into a saving unit; 4) entering second information after said printing data is saved in said saving unit; and 5) permitting the printing of said printing data saved in said saving unit when said second information corresponds with said first information.

According to a yet further aspect of the invention, there is provided a program for causing a computer to execute a process comprising the steps of: 1) receiving printing data to which a password is set up; 2) causing the printing data received in step 1) to be saved into a saving unit; 3) judging whether printing data to be printed is one which is issued from said saving unit or one which is not issued from said saving unit but rather the printing data received in step 1); and 4) controlling to allow the printing unit to print the printing data without requiring the password to be entered if the printing data to be printed is one which is not issued from said saving unit but rather the printing data received in step 1), and to allow the printing unit to print the printing data only after a password is entered if the printing data to be printed is one which is issued from said saving unit.

According to a yet further aspect of the invention, there is provided a program for causing a computer to execute a process comprising the steps of: 1) receiving printing data to which a password is set up; 2) causing a printing unit to print the received printing data without requiring the password to be entered; 3) causing the received printing data to be saved into a saving unit after causing the printing unit to print the received printing data in step 2); and 4) causing the printing unit to print the printing data after the password is entered if the printing data is retrieved from the saving unit to be reprinted.

The objects, characteristics and properties of this invention other than those set forth above will become apparent from the description given herein below with reference to preferred embodiments illustrated in the accompanying drawings.

BRIEF DESCRIPTION OF THE DRAWINGS

FIG. 5 is a diagram showing an example of a dialog box.

DETAILED DESCRIPTION OF THE PREFERRED EMBODIMENTS

The embodiments of this invention will be described below with reference to the accompanying drawings.

Figure 1:
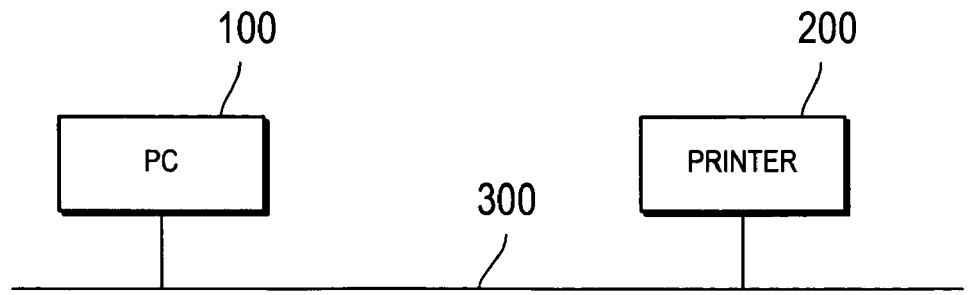
FIG. 1 is a block diagram showing the constitution of a printing system wherein a printing control method according to the first embodiment of the present invention is applied.

FIG. 1 is a block diagram showing the constitution of a printing system wherein a printing control method according to the first embodiment of the present invention is applied.

As shown in FIG. 1, the printing system is equipped with a PC 100 as well as a printer 200 serving as an image forming device capable of functioning as a printing control device, both of which are connected communicably with each other via a network 300. The network 300 can be a LAN based on standards such as Ethernet®, Token Ring, FDDI, etc., or a WAN consisting of LANs connected by, for example, a dedicated line.

The types and the number of equipment to be connected to the network are not limited to those shown in FIG. 1. The printer 200 can be connected directly with the PC 100 (local connection) without going through the network 300. In this case, an interface and a protocol, such as USB and IEEE 1284, are used.

Figure 2:
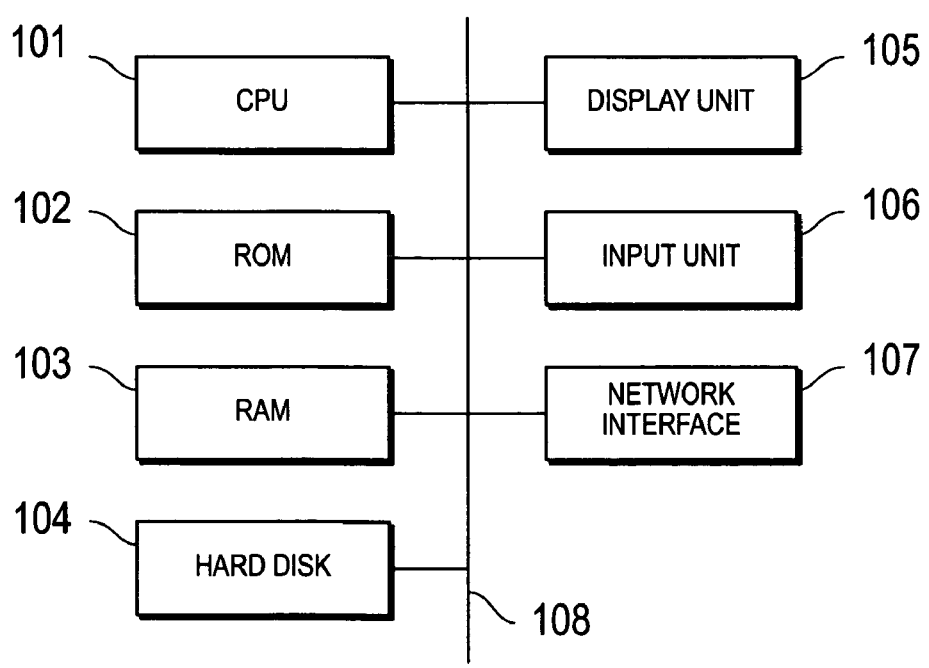
FIG. 2 is a block diagram showing the constitution of a PC shown in FIG. 1.

FIG. 2 is a block diagram showing the constitution of the PC 100 shown in FIG. 1. As shown in FIG. 2, the PC 100 includes a CPU 101 for controlling the entire device and executing various computations, a ROM 102 for storing programs and data, a RAM 103 for storing programs and data temporarily as a working area, a hard disk 104 as an external storage unit for storing various programs and data, a display unit 105 such as a liquid crystal display for displaying various information, an input unit 106 such as a keyboard and a mouse, for entering various instructions, and a network interface 107 such as a LAN card for connecting to the network 300, all of which are interconnected via a bus 108 for exchanging signals.

Figure 3:
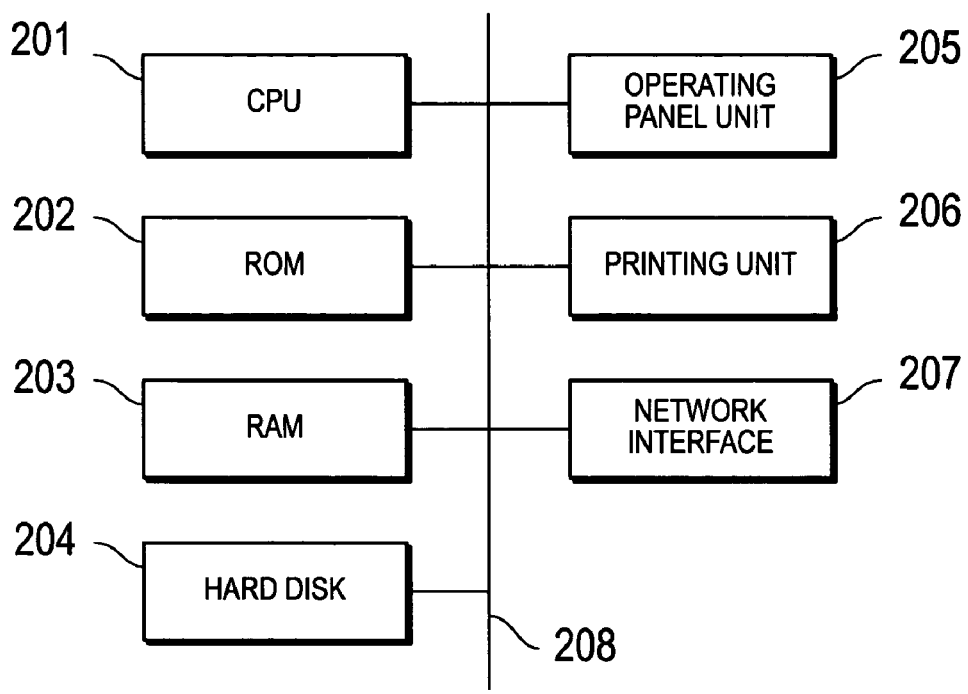
FIG. 3 is a block diagram showing the constitution of a printer shown in FIG. 1.

FIG. 3 is a block diagram showing the constitution of the printer 200 shown in FIG. 1. As shown in FIG. 3, the printer 200 includes a CPU 201, a ROM 202, a RAM 203, a hard disk 204, an operating panel unit 205, a printing unit 206, and a network interface 207, all of which are interconnected by a bus 208 for exchanging signals. Of the constituting elements of the printer 200, those that have the identical functions as the constituting members of the PC 100 are not described here to avoid duplications.

The RAM 203 can store the data received from the PC temporarily. The ROM 202 can store font information concerning fonts of characters. The hard disk 204 can store a printing job received from the PC. The printing jobs stored in the hard disk 204 can be executed repeated based on a user's instruction. However, the printing jobs can be stores in another storage unit (saving unit).

The operating panel unit 205 is used for displaying various kinds of information and entering various instructions. The printing unit 206 prints various data on a recording element such as paper using a known image forming process such as an electronic photography type process.

The PC 100 as well as the printer 200 can include constitutional elements other than those described above, or may not include a portion of the abovementioned elements.

Figure 4:
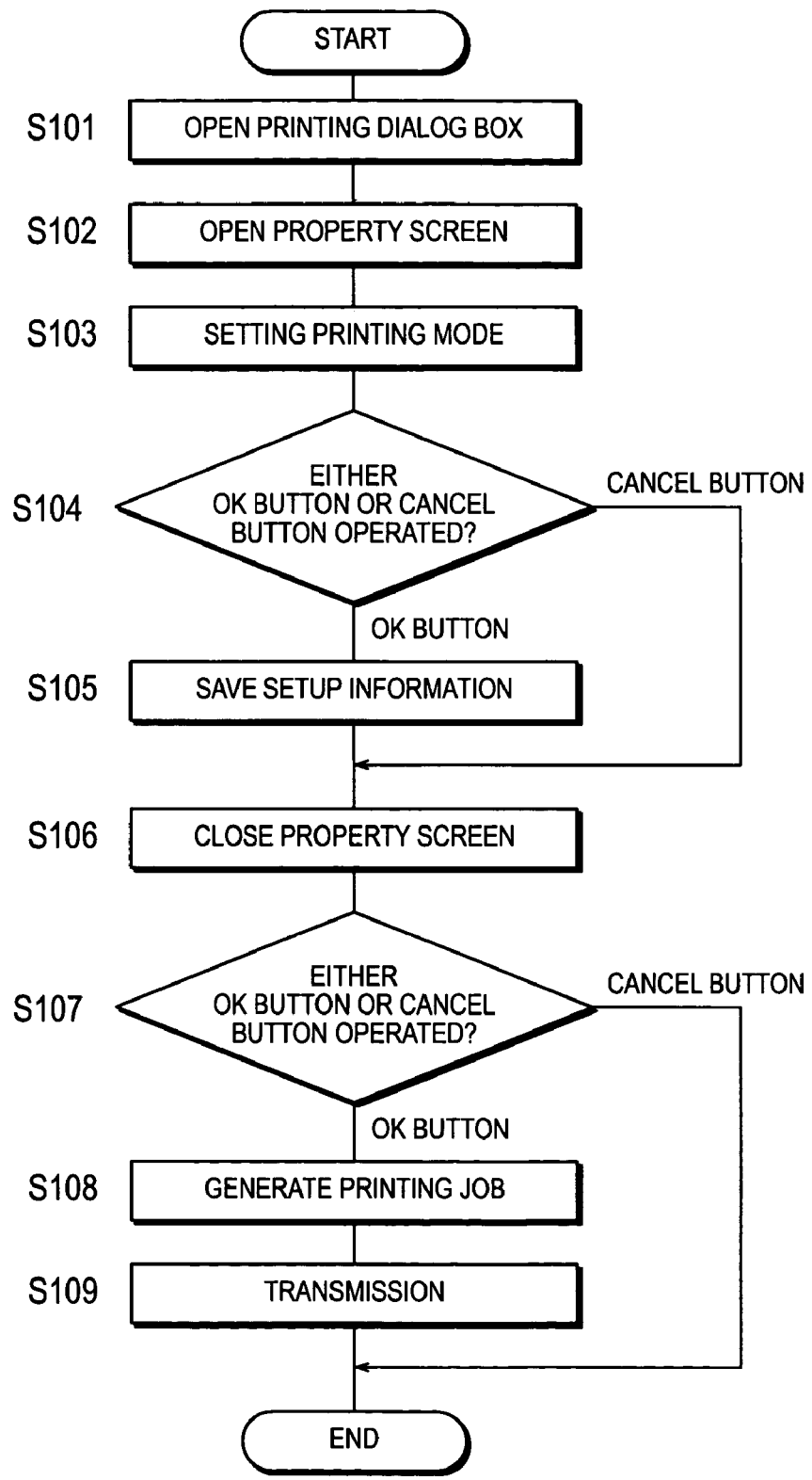
FIG. 4 is a flowchart for describing the process performed in the PC regarding the transmission of a printing job.

Next, the process performed in the PC 100 concerning the transmission of a printing job will be described with reference to FIG. 4 through FIG. 7. The algorithm shown in the flowchart of FIG. 4 is stored as a program in a storage unit such as the hard disk 104 of the PC 100 and executed by the CPU 101.

First, a printing dialog box 500 is opened from the specific application to be executed in the PC 100 as shown in FIG. 5 based on a user's operation.

Figures 6, 7:
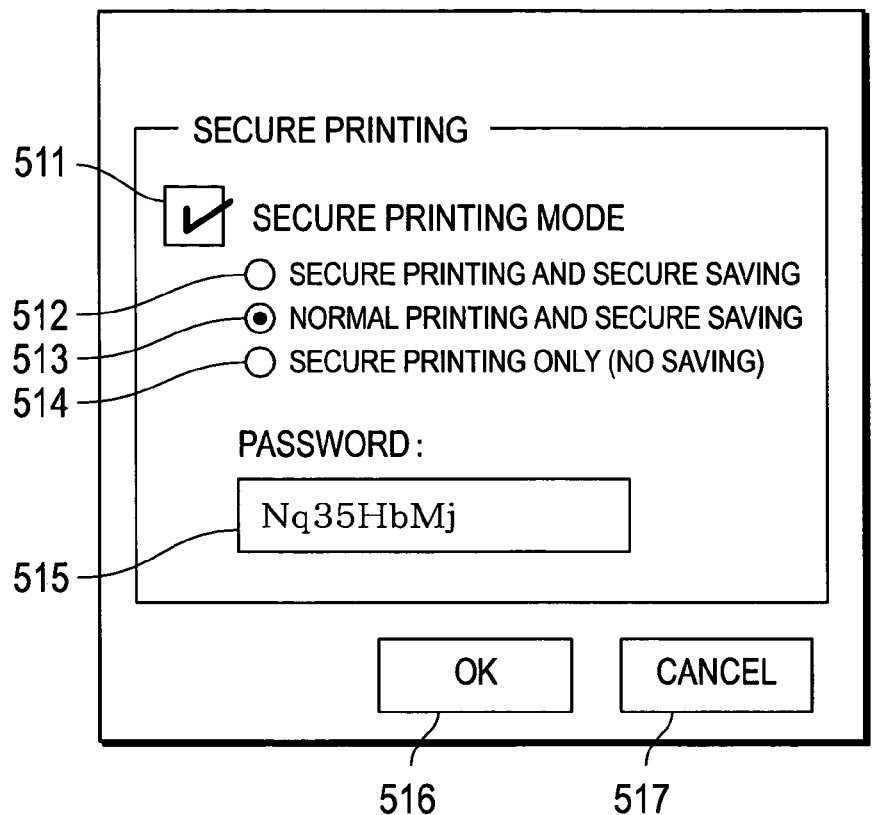
FIG. 6 is a diagram showing an example of a property screen.
FIG. 7 is a diagram showing an example of a printing job.

Next, as the user operates a property button 501 of the printing dialog box 500, a property screen 510 of the printer driver for controlling the printer as shown in FIG. 6 opens (S102). The printer driver is installed on the PC 100 under the control of the operating system.

The property screen 510 has a checkbox 511 for setting up a secure printing mode that is a printing mode for maintaining confidentiality, radio buttons 512–514 for selecting in more depth one of types of the secure printing modes, an edit box 515 for entering a password, an OK button 516, and a cancel button 517.

The printing mode is set up by the user's operation through the property screen 510 (S103). More specifically, the secure printing mode is set up by entering a checkmark in the checkbox 511. When the secure printing mode is set up, one of types of the secure printing modes is set up in more depth by selecting either one of the radio buttons 512–514. The secure printing mode and its particular type constitute printing condition.

When the secure printing mode is established, a password can be set up by entering a password in the edit box 515. A password is an identification code concerning printing data. A password can be setup individually for each printing data, or can be set up individually for each user.

The radio button 512 is intended for selecting the type of "secure printing and secure saving." If this type is selected, the printer that receives the printing job starts to print only when a specified password is entered. The processed printing job is saved in the printer and is allowed to be reprinted only when the specified password is entered. The radio button 513 is intended for selecting the type of "normal printing and secure saving." If this type is selected, the printer that receives the printing job starts to print immediately without requiring any entry of password. However, although the processed printing job is saved in the printer, it is allowed to be reprinted only when the specified password is entered. The radio button 514 is intended for selecting the type of "secure printing only (no saving)." If this type is selected, the printer that receives the printing job starts to print only when a specified password is entered. However, the processed printing job is not saved in this case. Thus, it is capable of selecting and setting up one of plural types of the secure printing modes thus enabling it to perform printing of the user's preference in this embodiment.

On the other hand, if a check mark is not entered into the checkbox 511, the secure printing mode will not be set up (secure printing mode is off) and the normal printing mode will be set up. In this case, the printer that receives the printing job starts to print immediately without requiring any entry of password. The processed printing job is not saved in this case. However, it is also possible to constitute the system in such a way that the printer saves the processed printing job and allows the reuse (reprinting) of the saved printing job freely without requiring password entry when the normal printing mode is set up.

In step S104, a judgment is made as to which of the OK button 516 or the cancel button 517 is operated on the property screen 510.

If the OK button 516 is operated, various kinds of setup information set up in step S103 are saved in a storage unit such as the RAM 103 (S105). On the other hand, when the cancel button 517 is operated, the program advances to step S106.

In step S106, the property screen 510 is closed. If the property screen 510 is not opened, the normal printing mode is set up as a default value, and the process of steps S102–S106 is omitted in this case.

Next, a judgment is made as to which of the OK button 502 or the cancel button 503 is operated in the printing dialog box 500 (see FIG. 5) (S107). When the cancel button 503 is operated, the execution of the process shown in FIG. 4 will be terminated.

When the OK button 502 is operated, a printing job that includes attribute data having setup information saved in step S105 and printing data that is to be actually printed on paper is generated (S108), and the generated printing job is transmitted to its destination, for example, the printer 200 (S109). The printing data and the attribute data can be transmitted separately.

FIG. 7 is a diagram showing an example of a printing job. As shown in FIG. 7, the printing job 600 includes attribute data 610 that has the abovementioned setup information and printing data (corresponds to "image data" in FIG. 7) 620. The attribute data 610 includes, for example, job name data 611, user name data 612, printing mode data 613, and password data 614.

The user name data 612 is automatically added with an identification code of the printing data transmitting side, specifically, a specified character string for identifying the user (for example, the log in name that the user uses when logging in the PC 100, which is saved in the PC 100) as the user name. The printing mode data 613 is added with a specified character string based on the abovementioned setup information following "SECUREMODE=." These character strings are, for example: "OFF" when the secure printing mode is not set up; "SECURE_AND_SAVE" if the secure printing mode is set up and the "secure printing and secure saving" type is selected; "NORMAL_AND_SAVE" if the "normal printing and secure saving" type is selected; and "SECURE_ONLY" if the "secure printing only (no saving)" type is selected. The value entered into the edit box 515 is added as a password to password data 614. The attribute data 610 may include printing attribute information specifying the number of copies to be printed and the size of the paper for printing or the printing attribute information can be transmitted separately to the printer.

Figure 8:
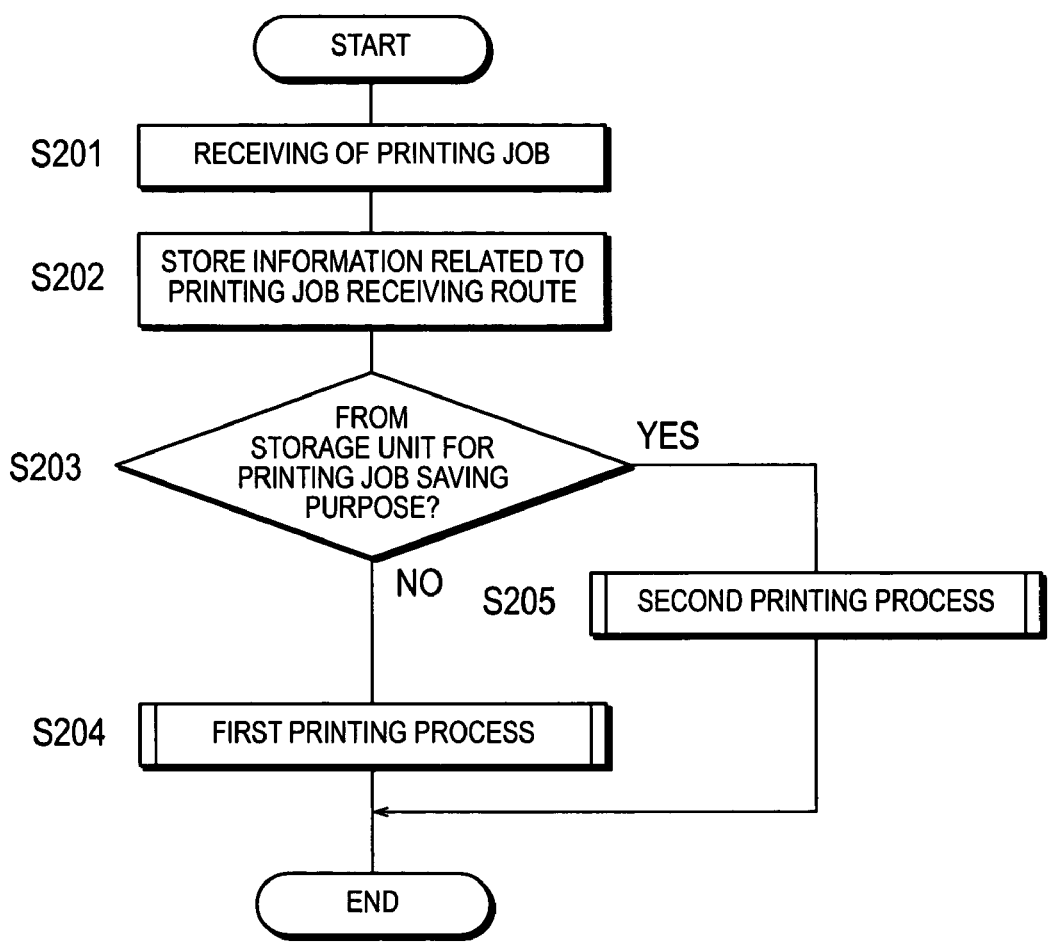
FIG. 8 is a flowchart for describing the process performed in the printer regarding the reception of a printing job.
Figure 9:
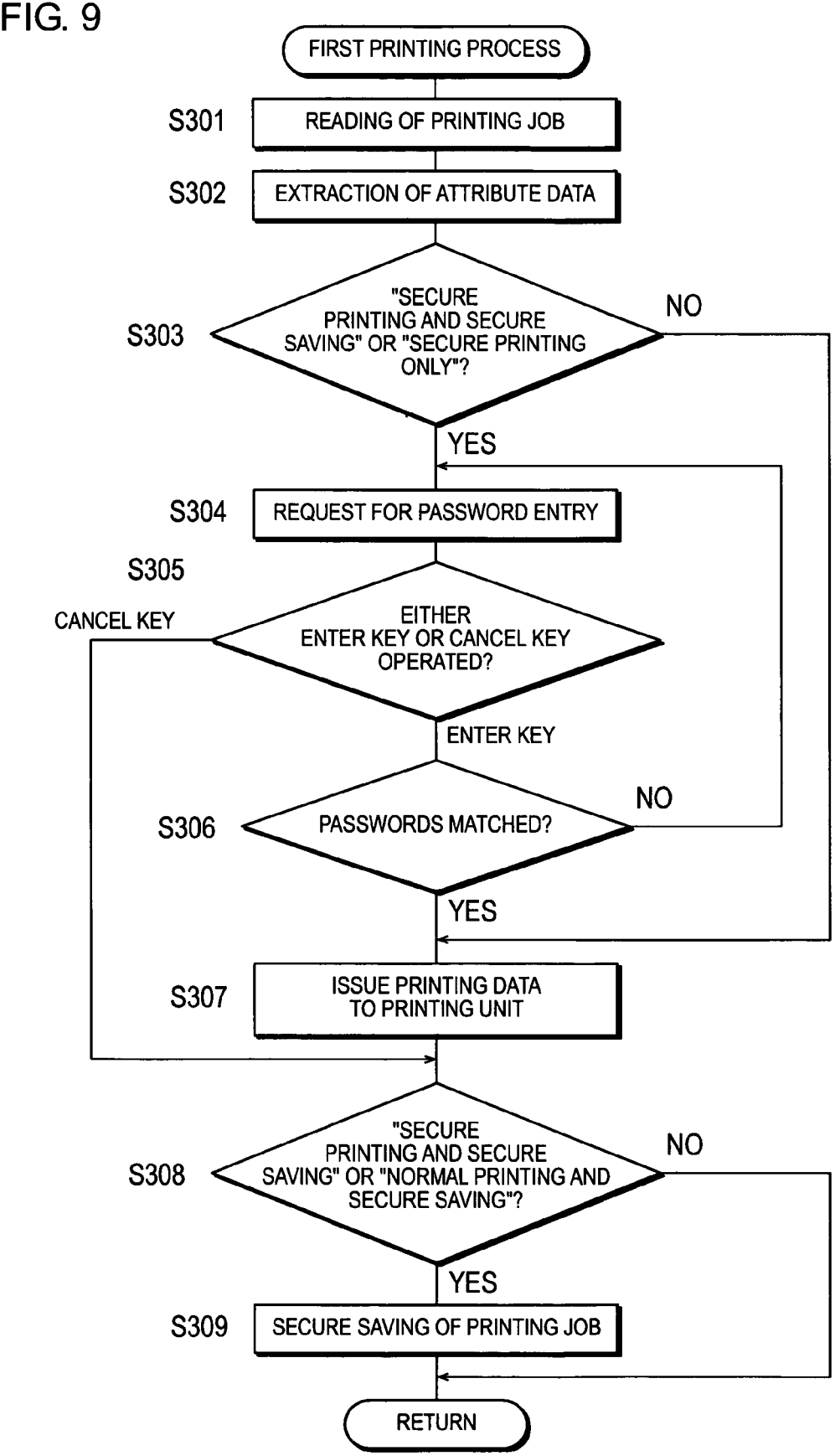
FIG. 9 is a flowchart for describing the first printing process shown in FIG. 8.
Figure 10:
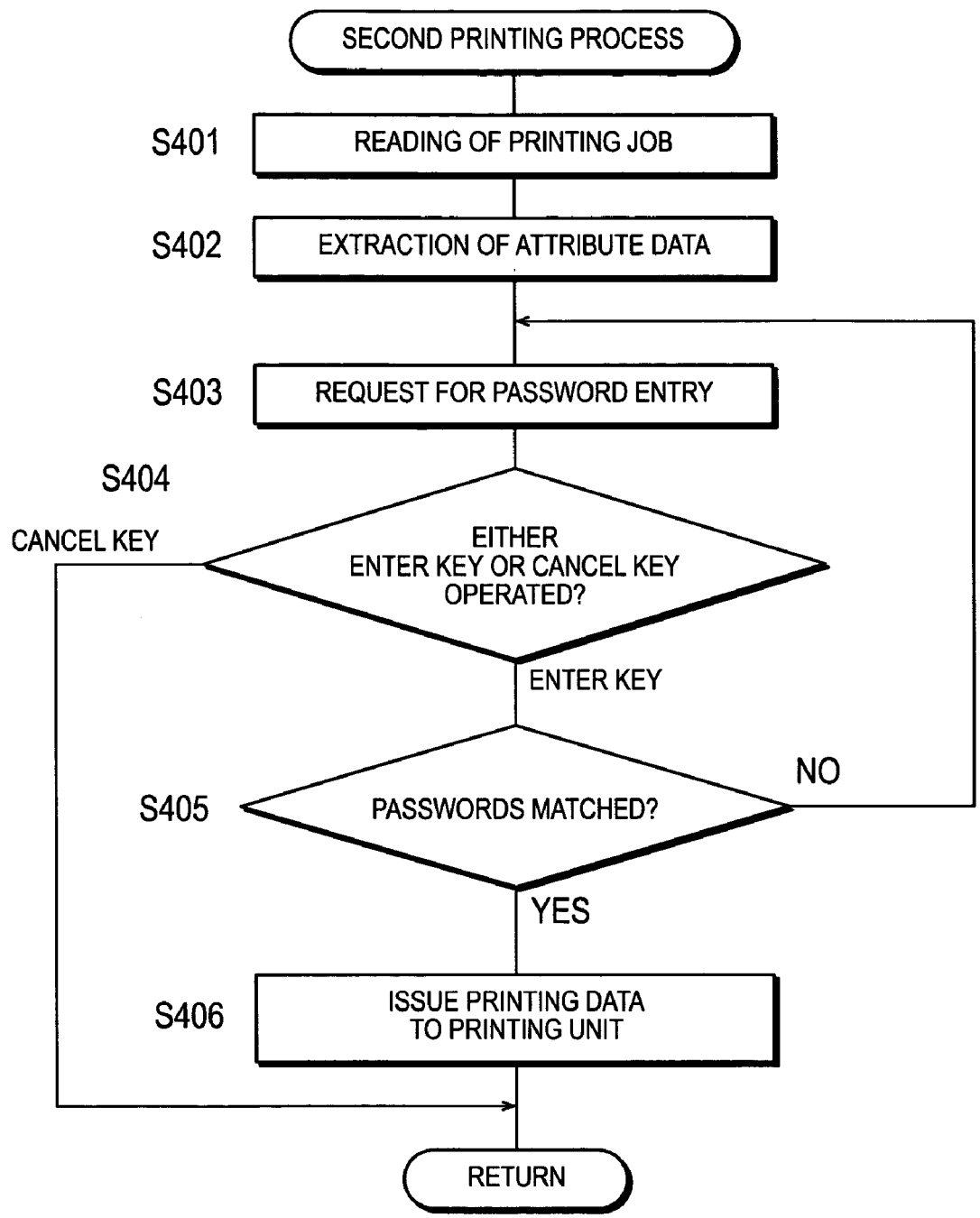
FIG. 10 is a flowchart for describing the second printing process shown in FIG. 8.

Next, the process performed in the printer 200 concerning the reception of a printing job will be described with reference to FIG. 8–FIG. 12. The algorithm shown in the flowcharts of FIG. 8 through FIG. 10 is stored as a program in a storage unit such as the ROM 202 of the printer 200 and executed by the CPU 201.

First, a printing job is received (S201).

Figure 11:
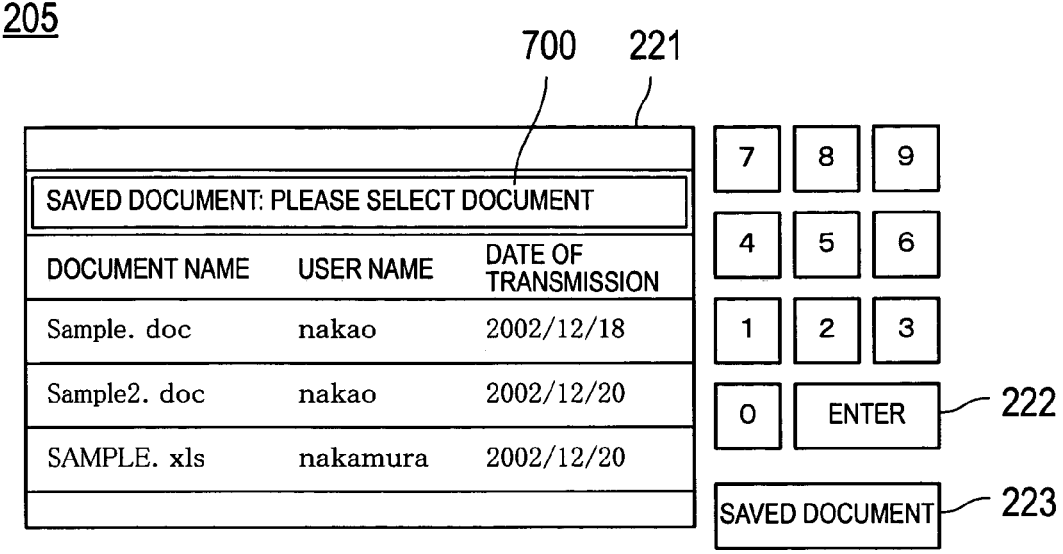
FIG. 11 is a diagram showing the essential part of an operating panel unit when it is displaying a list of printing jobs saved in a hard disk.

FIG. 11 is a diagram showing the essential part of the operating panel unit when it is displaying a list of printing jobs saved in the hard disk. As shown in FIG. 11, a selection screen 700 of printing job (corresponding to "saved document" in FIG. 11) is displayed on a display panel 221 as the user operates on a document saving button 223 of the operating panel unit 205. When a specific printing job on the selection screen 700 is selected and an enter key 222 is pressed, the printing job becomes to be received.

Next, the information concerning the receiving route of the printing job is stored into a storage unit such as the RAM 203 (S202). More specifically, the receiving route information is stored indicating whether the received printing job is a printing job transferred from the hard disk 204 for the printing job storage purpose based on the user's operation through the operating panel unit 205, or a printing job received from other sources such as the PC 100 via the network interface 207.

In step S203, a judgment is made based on the receiving route information as to whether the received printing job is a printing job transferred from the hard disk 204 for the printing job storage purpose or not.

If the received printing job is not a printing job transferred from the hard disk 204 for the printing job storage purpose, in other words, if it is a printing job received from the PC 100 via the network interface 207 (S203: No), the first printing process is performed (S204). On the other hand, if the received printing job is a printing job transferred from the hard disk 204 for the printing job storage purpose (S203: Yes), the second printing process is performed (S205) The details of the first printing process and the second printing process will be described later.

Next, the first printing process in step S204 shown in FIG. 8 will be described below with reference to FIG. 9.

First, the printing job 600 shown in FIG. 7 is read into a storage unit such as the RAM 203 (S301). Next, the attribute data 610 is extracted from the printing job 600 and stored in a specific area of a storage unit such as the RAM 203 (S302).

In step S303, a judgment is made as to which of the two types of the secure printing modes, i.e., "secure printing and secure saving" or "secure printing only (no saving)," is selected by referring to the printing data mode 613 of the attribute data 610. If neither the "secure printing and secure saving" nor the "secure printing only (no saving)" type is selected (S303: No), in other words, if the secure printing mode is not selected or the "normal printing and secure saving" type in the secure printing mode is selected in this embodiment, the program proceeds to step S307.

If either the "secure printing and secure saving" or the "secure printing only (no saving)" type in the secure printing mode is selected (S303: Yes), password entry is required (S304). In this case, the password input request screen is displayed on the display panel 221.

Figure 12:
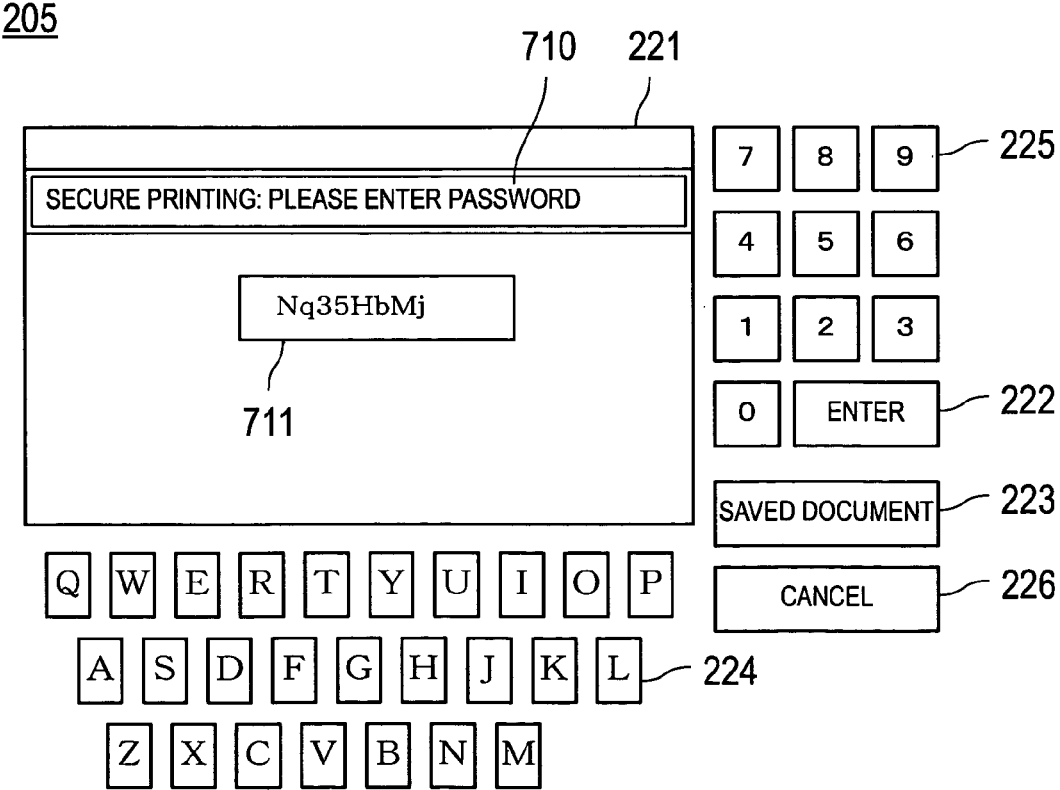
FIG. 12 is a diagram showing the essential part of the operating panel unit when it is displaying a password entry request screen.

FIG. 12 is a diagram showing the essential part of the operating panel unit when it is displaying the password entry request screen. A password can be entered into an edit box 711 of the input request screen 710 by the user by means of character keys 224 or ten-keys 225.

In step S305, a judgment is made as to whether either of an enter key 222 or a cancel key 226 of the operating panel unit 205. If the cancel key 226 is operated, the program advances to step S308.

If the enter key 222 is operated, a judgment is made as to whether the password entered in the edit box 711 matches with the password contained in password data 614 of the attribute data 610 stored in step S302 or not (S306). If both passwords do not match (S306: No), the program returns to step S304 and the entry of password is requested again. If the two passwords match (S306: Yes), the program advances to step S307.

In step S307, the printing data 620 (see FIG. 7) is issued to the printing unit 206. The printing unit 206 prints the printing data 620 on a recording element such as paper.

Furthermore, a judgment is made as to which of the two types of the secure printing modes, i.e., "secure printing and secure saving" or "normal printing and secure saving," is selected by referring to the printing data mode 613 of the attribute data 610 (S308).

If either "secure printing and secure saving" or "normal printing and secure saving," is selected (S308: Yes), the printing job 600 (see FIG. 7) is saved into the hard disk 204 for printing job saving purpose.

On the other hand, if neither the "secure printing and secure saving" nor the "normal printing and secure saving" type is selected (S308: No), in other words in this embodiment, if the secure printing mode is not selected or the "secure printing only (no saving)" type in the security printing mode is selected, the execution of the process of FIG. 9 is terminated without saving the printing job.

Next, the second printing process in step S205 shown in FIG. 8 will be described below with reference to FIG. 10.

First, the printing job 600 shown in FIG. 7 is read into a storage unit such as the RAM 203 (S401). Next, the attribute data 610 is extracted from the printing job 600 and stored in a specific area of a storage unit such as the RAM 203 (S402).

Next, password entry is requested (S403). In this case, the password input request screen is displayed on the display panel 221 (see FIG. 12). A password can be entered into the edit box 711 of the input request screen 710 by the user by means of the character keys 224 or the ten-keys 225.

In step S404, a judgment is made as to whether either of the enter key 222 or the cancel key 226 of the operating panel unit 205 is operated. When the cancel key 226 is operated, the execution of the process shown in FIG. 10 will be terminated.

If the enter key 222 is operated, a judgment is made as to whether the password entered in the edit box 711 matches with the password contained in the password data 614 of the attribute data 610 stored in step S402 or not (S405). If both passwords do not match (S405: No), the program returns to step S403 and the entry of a password is request again.

If the two passwords match (S405: Yes), the printing data 620 (see FIG. 7) will be issued to the printing unit 206 (406). The printing unit 206 prints the printing data 620 on a recording element such as paper.

As can be seen from the above in the first embodiment, upon receiving the printing data and the password set up for the particular printing data, the printer 200 allows the received printing data to be printed and also saves this printing data into the hard disk 204. When the password entered into the printer 200 after saving the printing data matches with the password received from the PC 100 together with said printing data, the printing of said printing data saved in the hard disk 204 is allowed.

Therefore, a user can obtain a printed matter of the printing data quickly at the place where printing is performed, while maintaining confidentiality of said printed data, as the printed matter is quickly obtained, by simply instructing the transmission of the printing data and the password to the printer only once. Also, since the processed printing data is saved under a condition that it cannot be printed unless a proper password is entered, the confidentiality of the printing data while it is in storage is secured.

Next, the second embodiment of the invention will be described below. The following description will concentrate mainly on those points that are different from the first embodiment. Since the hardware constitution of the second embodiment is similar to that of the first embodiment, the same reference numerals are assigned to them thus omitting their descriptions.

The differences between them are broadly as follows. In the first embodiment, a judgment is made as to whether the password entered into the printer 200 after saving printing data matches with the password received from the PC 100 together with said printing data or not, and the printing of said printing data saved in the hard disk 204 is permitted depending on said judgment. On the other hand, in the second embodiment, a judgment is made as to whether the password entered into the printer 200 after saving printing data corresponds with the user name received from the PC 100 together with said printing data or not based on a correspondence table preregistered in the printer 200, and the printing of said printing data saved in the hard disk 204 is permitted depending on said judgment.

Figure 13:
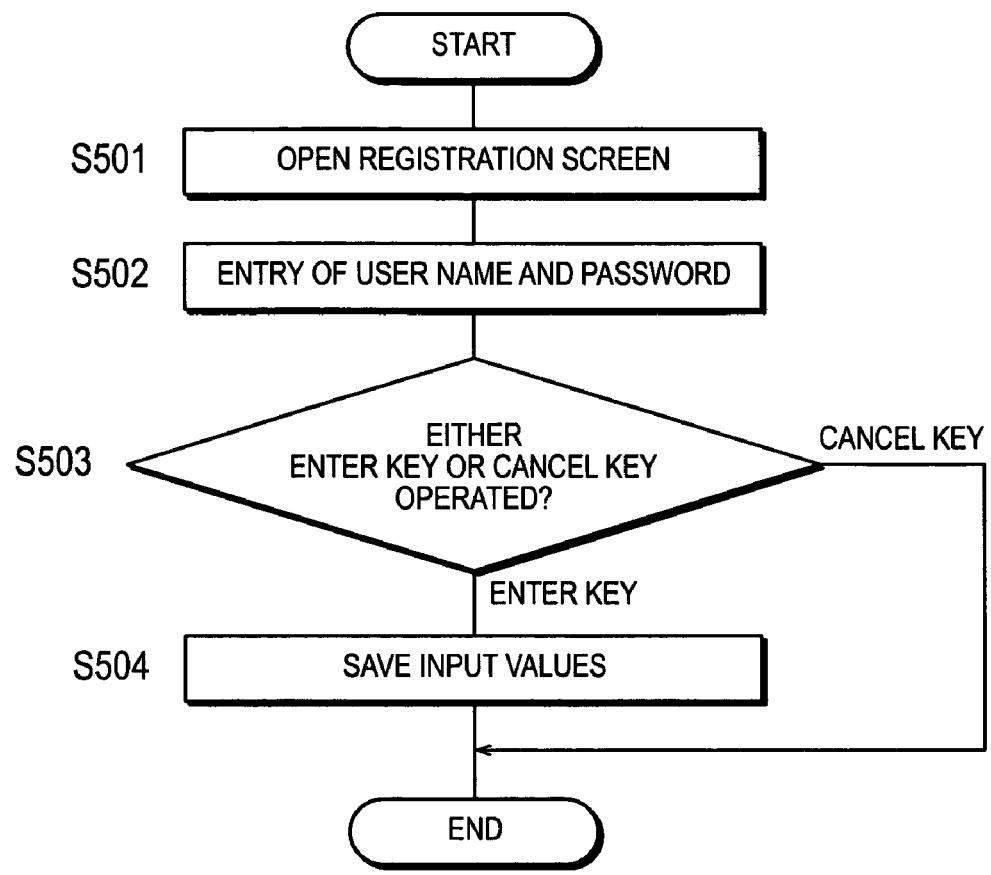
FIG. 13 is a flowchart for describing a process for preregistering a correspondence table of user names and passwords to be conducted at the printer in a printing system to which a printing control method according to the second embodiment of the present invention is applied.
Figures 14, 15:
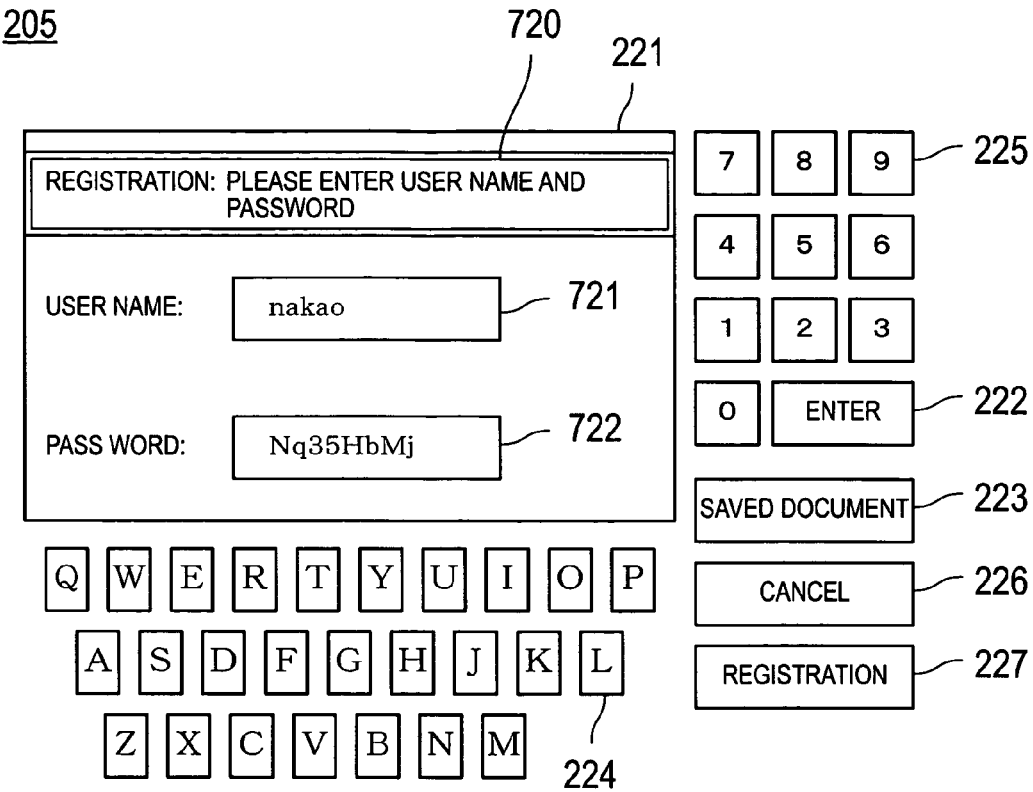
FIG. 14 is a diagram showing an example of a registration screen for registering the correspondence table.
FIG. 15 is a diagram showing an example of a correspondence table.

FIG. 13 through FIG. 15 show a flowchart for describing a process of registering a correspondence table of user names and passwords to be conducted at the printer 200 in a printing system, to which a printing control method according to the second embodiment of the present invention is applied. The algorithm shown in the flowchart of FIG. 13 is stored as a program in a storage unit such as the ROM 202 of the printer 200 and executed by the CPU 201.

First, when a user operates a registration button 227 of the operating panel unit 205, the display panel 221 displays a registration screen 720 for registering the correspondence table of the user names and passwords as shown in FIG. 14 (S501).

Next, a user name and a password are entered into a user name edit box 721 and a password edit box 722 of the registration screen 720 respectively by the user's operations on character keys 224 and ten-keys 225 (S502).

In step S503, a judgment is made as to whether either of an enter key 222 or a cancel key 226 of the operating panel unit 205 is operated. When the cancel key 226 is operated, the execution of the process shown in FIG. 13 will be terminated.

When the enter key 222 is operated, the values entered in step S502 are saved as the correspondence table in a storage unit such as the hard disk 204 (S504). More specifically, a correspondence table 650 such as the one shown in FIG. 15 is generated. Here, a line of information is added to the correspondence table 650 shown in FIG. 15 each time when a user name and a password are entered and the enter key 222 is operated at the registration screen 720. Although it is shown that the correspondence table 650 is saved in a text file format in FIG. 15, it can also be saved as data of a matrix format.

Next, the process relative to the printing job's transmission executed in the PC 100 concerning the second embodiment will be described below. The overall procedure is identical to the flowchart of FIG. 4 so that only the difference will be described omitting the drawing and detail descriptions.

Figure 16:
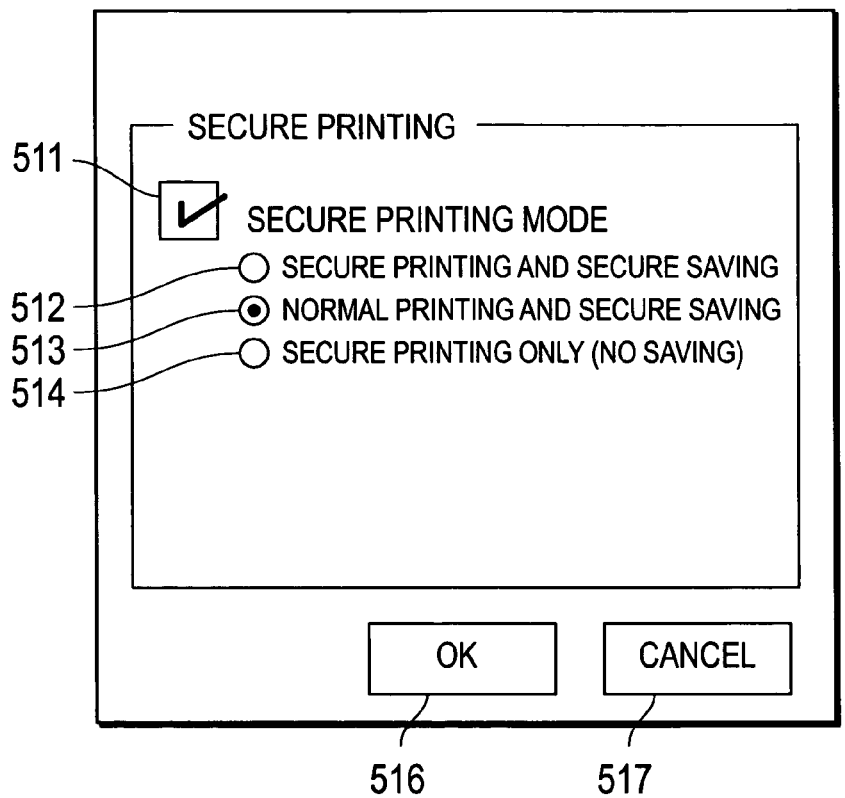
FIG. 16 is a diagram showing an example of a property screen.
Figure 17:
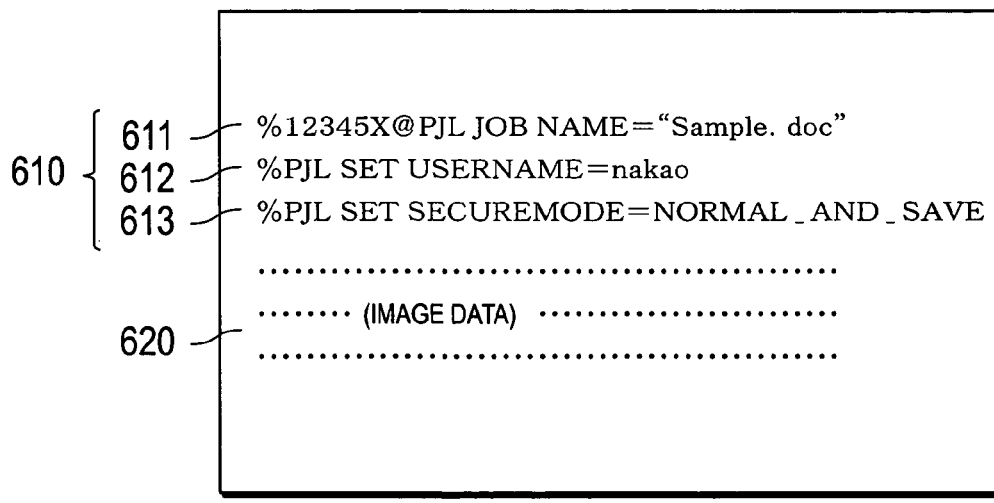
FIG. 17 is a diagram showing an example of a printing job.

In other words in the second embodiment, a property screen 510a opens as shown in FIG. 16 in correspondence with step S102 of FIG. 4. The property screen 510a does not have the edit box 515 for entering the password as shown in the property screen 510 of the first embodiment. Therefore, the user does not need to enter the password during the transmission of the printing data even when the security printing mode is specified. A printing job 600a is generated as shown in FIG. 17 in correspondence with step S108 of FIG. 4. The printing job 600a does not have the password 614 that exists in the printing job 600 of the first embodiment.

Next, the process relative to the printing job's reception executed in the printer 200 concerning the second embodiment will be described below. The overall procedure is identical to the flowchart of FIG. 8 so that only the difference will be described omitting the drawing and detail descriptions.

In other words, the second embodiment is partially different from the first embodiment in the contents of the first printing process and the second printing process that correspond to steps S204 and S205 of FIG. 8.

Figure 18:
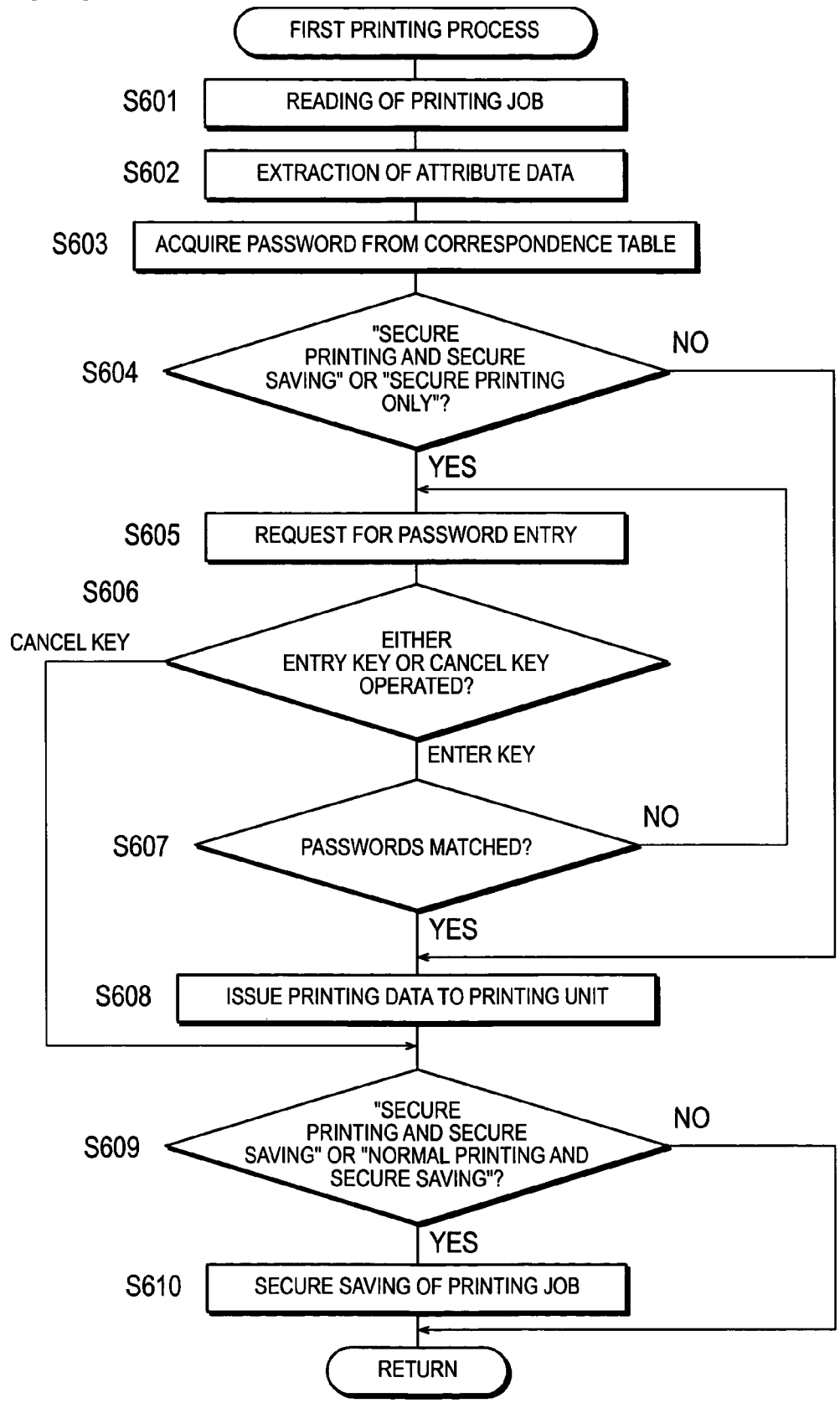
FIG. 18 is a flowchart for describing the first printing process in the second embodiment.

FIG. 18 is a flowchart for describing the first printing process in the second embodiment. The algorithm shown in the flowcharts of FIG. 18 is stored as a program in a storage unit such as the ROM 202 of the printer 200 and executed by the CPU 201 (it is similar to the case of FIG. 19 which will be described later).

Figure 19:
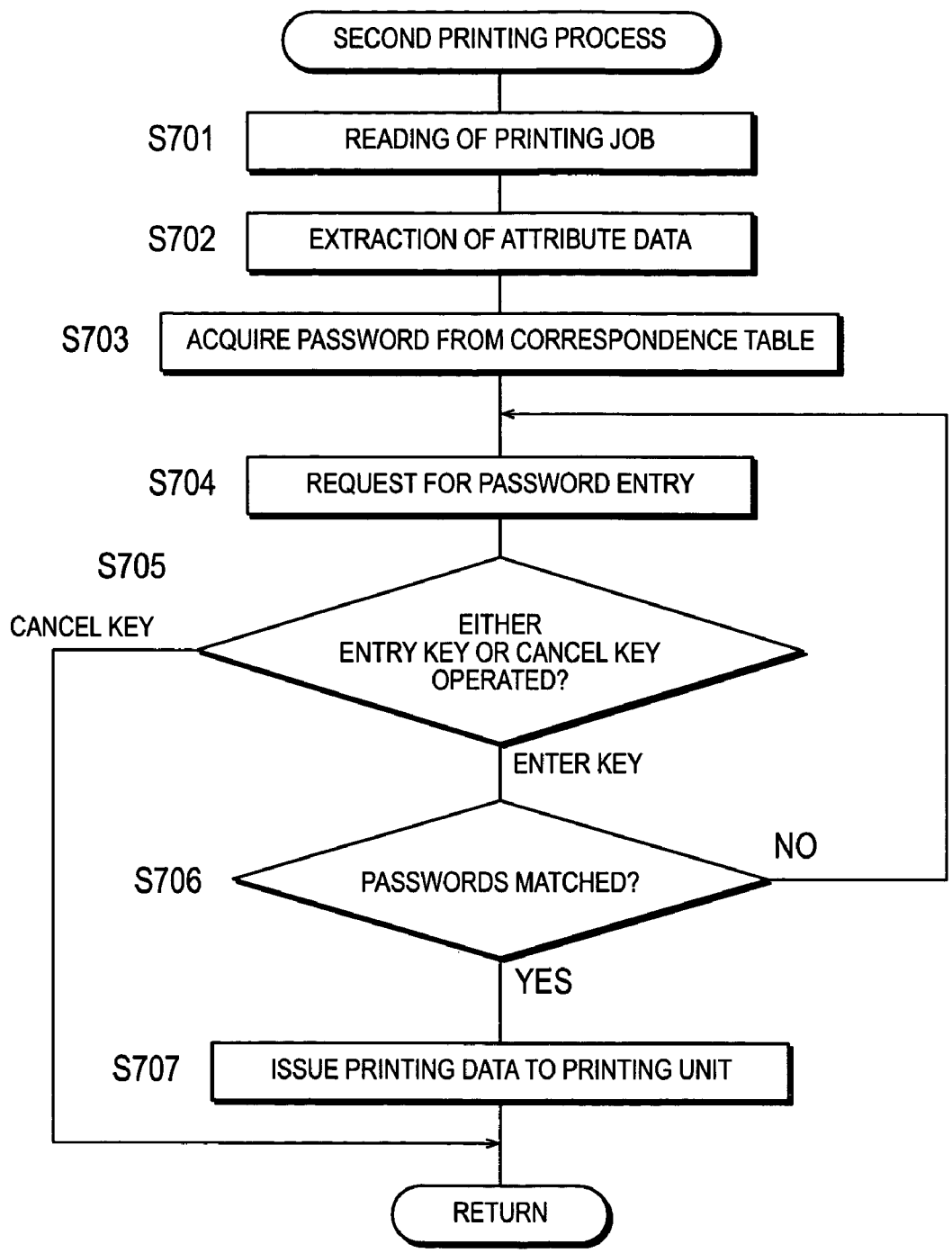
FIG. 19 is a flowchart for describing the second printing process in the second embodiment.

S601, S604–S606, and S608–S610 shown in FIG. 18 are identical to steps S301, S303–S305, and S307–S309 shown in FIG. 19, so that their descriptions are omitted.

In step S602, attribute data 610a is extracted from the printing job 600a and stored in a specific area of a storage unit such as the RAM 203. The attribute data 610a includes, for example, the job name data 611, the user name data 612, and the printing mode data 613, but not the password data 614.

Next, a password (e.g., "Nq35HbMj") that corresponds with the user name (e.g., "nakao") contained in the user name data 612 of the attribute data 610a stored in step S602 is acquired by referencing the correspondence table 650 saved in the hard disk 204 (S603).

A judgment is made in step S607 as to whether the password entered in the edit box 711 (see FIG. 12) matches with the password acquired in the correspondence table in step S603.

FIG. 19 is a flowchart for describing the second printing process in the second embodiment.

Steps S701, S704, S705, and S707 shown in FIG. 19 are identical to steps S401, S403, S404, and S406 shown in FIG. 10, so that their descriptions are omitted.

In step S702, the attribute data 610a is extracted from the printing job 600a and stored in a specific area of a storage unit such as the RAM 203. The attribute data 610a includes the user name data 612, but does not include the password data 614.

Next, a password that corresponds with the user name contained in the user name data 612 of the attribute data 610a stored in step S702 is acquired by referencing the correspondence table 650 saved in the hard disk 204 (S703).

A judgment is made in step S707 as to whether the password entered in the edit box 711 matches with the password acquired in the correspondence table in step S703.

As can be seen from the above in the second embodiment, upon receiving the printing data and the user name setup for the particular printing data, the printer 200 allows the received printing data to be printed and also saves this printing data into the hard disk 204. When it is judged based on the correspondence table preregistered in the printer 200 that the password entered into the printer 200 after saving the printing data corresponds with the user name received from the PC 100 together with said printing data, the printing of said printing data saved in the hard disk 204 is allowed.

Therefore, a user can obtain a printed matter of the printing data quickly at the place where printing is performed, while maintaining confidentiality of said printed data, as the printed matter is quickly obtained, by simply instructing the transmission of the printing data and the user name to the printer only once. Also, since the processed printing data is saved under a condition that it cannot be printed unless a proper password corresponding to the user name is entered, the confidentiality of the printing data while it is in storage is secured. Moreover, it eliminates the need for entering the password each time printing data is transmitted, thus improving the work efficiency. Also, since the user name to be transmitted to the printer can be automatically set up using the information saved on the transmission side equipment while the identification information that does not require confidentiality becomes usable, the work efficiency is further improved.

It is obvious that this invention is not limited to the particular embodiments shown and described above but may be variously changed and modified without departing from the technical concept of this invention.

For example, a work station, an MFP (Multi-Function Peripheral), a facsimile machine, a scanner and other similar devices can be used in place of a PC as the transmission device of printing jobs. Also, a copying machine, an MFP and other devices can be used in place of a printer as the printing device.

Moreover, although a case wherein the printer 200 functions as the printing control device in the above-mentioned embodiments, the invention is not limited to it. For example, a device that is different from the printer 200, for example, a server on the network 300 to which the printer 200 is connected can function as the printing control device.

Moreover, although it is necessary to have a password entered into the printer 200 via the operating panel unit 205 in case when printing data is to be printed after said printing data is security saved in the above-mentioned embodiments, the present invention is not limited to that method. The password can be transmitted to the printer 200 from another device, for example, via the network 300.

Also, the present invention can be applied to a case wherein an advance release mode (proof printing), in which a copy of the document is to be printed in advance from the designated plurality of copies. In the proof printing, one copy of the document is printed in advance when, for example, 10 copies are specified to be printed, while the printing of the remaining nine copies is sustained. After confirming the contents of the printed one advance copy, the user can instruct the system to approve the printing of the remaining nine copies through the operating panel unit. By applying the present invention to the proof printing, it is possible to provide a printing method wherein the first copy can be quickly obtained by printing it without requiring the entry of the password, while the remaining copies can be printed only upon receiving the proper password.

The printing control device and the printing control method of the present invention is realizable by means of either a dedicated hardware circuit or a programmed computer. Said program can be provided either by a computer readable recording medium such as a flexible disk and a CD-ROM, or by being supplied on-line via a network such as the Internet. In this case, the program recorded on the computer readable recording medium is normally transferred to and stored in a storage unit such as a hard disk. Said program can also be provided as independent application software or can be built into the software of the printing control device as a part of its function.

What is claimed is:

1. A printer control device for controlling a printer, said printer control device comprising a means for providing a user with an option to select one of a) at least one security code is required for both a first printing of print data and a reprinting of said print data, and b) the at least one security code is required only for the reprinting of said print data.

2. The printer control device of claim 1, wherein the printer control device provides the user with a user interface on which the option is displayed.

3. The printer control device of claim 2, wherein the at least one security code is manually input by a user through the user interface.

4. The printer control device of claim 1, wherein the at least one security code uniquely corresponds to the user.

5. The printer control device of claim 1, wherein a single security code is commonly assigned to both the first printing of said print data and the reprinting of said print data.

6. A method for controlling a printer, the method comprising a step of providing a user with an option to select one of a) at least one security code is required for both a first printing of print data and a reprinting of said print data, and b) the at least one security code is required only for the reprinting of said print data.

7. The method of claim 6, wherein the option is provided by displaying a user interface.

8. The method of claim 7, wherein the at least one security code is manually input by a user through the user interface.

9. The method of claim 6, wherein the at least one security code uniquely corresponds to the user.

10. The method of claim 6, wherein a single security code is commonly assigned to both the first printing of said print data and the reprinting of said print data.

11. A computer program stored in a computer storage, the computer program causes a computer to carry out the method of claim 6.

12. The computer program of claim 11, wherein the option is provided by displaying a user interface.

13. The computer program of claim 12, wherein the at least one security code is manually input by a user through the user interface.

14. The computer program of claim 11, wherein the at least one security code uniquely corresponds to the user.

15. The computer program of claim 11, wherein a single security code is commonly assigned to both the first printing of said print data and the reprinting of said print data.

* * * * *